United States Patent [19]

Kose et al.

[11] 3,943,396

[45] Mar. 9, 1976

[54] HIGH LUMINOUS INTENSITY ARC ELECTRODE OF LANTANUM CHROMITE

[75] Inventors: Saburo Kose; Makoto Kinoshita, both of Ikeda, Japan

[73] Assignee: Agency of Industrial Science & Technology, Tokyo, Japan

[22] Filed: Mar. 25, 1974

[21] Appl. No.: 454,227

[30] Foreign Application Priority Data

May 21, 1973 Japan.............................. 48-57062

[52] U.S. Cl. ................. 313/311; 313/218; 313/352
[51] Int. Cl.² ..... H01J 1/05; H01J 1/14; H01J 1/38; H01J 1/48
[58] Field of Search ........... 313/311, 352, 357, 337, 313/218

[56] References Cited

UNITED STATES PATENTS

| | | | |
|---|---|---|---|
| 2,472,923 | 6/1949 | Schmerber | 313/311 X |
| 3,198,932 | 8/1965 | Weatherly | 313/311 |
| 3,631,290 | 12/1971 | Loeffler | 313/311 |

*Primary Examiner*—Saxfield Chatmon, Jr.
*Attorney, Agent, or Firm*—Oblon, Fisher, Spivak, McClelland & Maier

[57] ABSTRACT

Arc electrodes formed of the sinter of lanthanum chromite or of a compound having a part of the lanthanum component of lanthanum chromite replaced by at least one member selected from the group consisting of calcium, magnesium and strontium.

4 Claims, No Drawings

HIGH LUMINOUS INTENSITY ARC ELECTRODE OF LANTANUM CHROMITE

BACKGROUND OF THE INVENTION

This invention relates to arc electrodes.

Arc electrodes have heretofore been made by using, as materials therefor, carbon or metals such as tungsten, iron, copper and nickel. When a DC potential is applied between electrodes formed of bars of such a material, the impulsion of ions which immediately ensues elevates the temperature of the cathode and consequently accelerates the discharge of thermal electrons, with the result that the arc discharge is continuous and takes place at a relatively low temperature. The arc lamp which utilizes the phenomenon of this arc discharge has advantages such as high luminous intensity, low brightness temperature and high electric power efficiency. Thus, it finds extensive utility in cineprojectors, photographic illuminators, flood lights, etc.

The conventional arc electrodes, when used in the atmosphere, provide neither fully satisfactory luminous intensity nor spectral distribution approximating that of white light. When they are used in the air, they are deficient in stability and the high-temperature zones of the electrodes undergo heavy oxidative corrosion and cause oxides of low electroconductivity to deposit on the surface thereof.

A primary object of this invention is to provide arc electrodes which give sufficient luminous intensity and produce spectral distribution approximating that of white light even in the atmosphere.

Another object of this invention is to provide arc electrodes which are stable in the air and which involve no appreciable oxidative corrosion.

BRIEF SUMMARY OF THE INVENTION

To accomplish the end described above, the arc electrodes of this invention are formed of a sinter which is composed preponderantly of lanthanum chromite.

This invention also embraces arc electrodes which are formed of the sinter of a compound having a part of the lanthanum component of lanthanum chromite replaced by any of calcium, magnesium and strontium or a mixture thereof.

By the present invention, it is made possible to manufacture arc electrodes which have sufficient luminous intensity and produce spectral distribution approximating that of white light in the atmosphere and which are stable, involve no appreciable oxidative corrosion and enjoy excellent electroconductivity even in the air.

Other and further objects of this invention will become obvious upon an understanding of the illustrative embodiments described herein or will be indicted in the appended claims.

DETAILED DESCRIPTION OF THE INVENTION

This invention relates to arc electrodes formed of a sinter of lanthanum chromite ($LaCrO_3$) or of the sinter of a compound having a part of the lanthanum component of said lanthanum chromite replaced by at least one member selected from the group consisting of calcium, magnesium and strontium.

Hereinafter, the term "lanthanum chromite" referred to in the specification hereof shall be interpreted as embracing lanthanum chromite the lanthanum component of which is partly replaced by at least one member selected from the group consisting of calcium, magnesium and strontium.

The arc electrodes according to the present invention are excellent in heatproofness and electroconductivity. The arc lamp using these arc electrodes provides high luminous intensity and produces spectral distribution approximating that of white light even in the atmosphere and enjoys the pronounced advantage that stable performance is retained even at temperatures exceeding 2500°C.

Now the process followed for the manufacture of the arc electrodes will be described.

As the raw material, lanthanum chromite is used in the form of finely-divided particles generally of a particle diameter not greater than 325 mesh (measured by Tyler Standard screen). Particularly in producing arc electrodes having increased resistance to thermal impacts, electrically fused particles (obtained by having a carbon electrode inserted in lanthanum chromite, passing therethrough a current of electricity and cooling and coarsely dividing) having a particle diameter of 100 – 200 mesh are added to the raw material particles at a rate of 20 – 50 percent by weight based on the latter particles. The sintering temperature can be lowered by further adding a sintering-accelerating agent to the lanthanum chromite as the raw material at a rate of 0.5 – 2.0 percent by weight based on the raw material. A typical example of the sintering-accelerating agent is boron oxide. Paraffins are also effective. The sintering-accelerating agent is added in the form of power or aqueous solution to the lanthanum chromite. Then the raw material is sintered in the atmosphere under normal pressure or under an increased pressure. When the sintering is made under an increased pressure, desired sintering is obtained by having a graphite mold filled with the raw material and keeping the raw material in the mold under a pressure of about 150 – 250 kg/cm$^2$ at a temperature of 1200° – 1400°C for 20 to 60 minutes.

The sinter produced by the treatment described above generally exhibits a large value of resistance on the order of 100 KΩ-cm. Therefore, the sinter is further subjected to an oxidizing treatment so as to acquire enough resistance expected of arc electrodes. This oxidizing treatment is accomplished by allowing the sinter to stand in the atmosphere at 1500°C for 1 to 2 hours. The oxidized sinter is used as an arc electrode in its unaltered form or after having been shaped to a required form.

Microscopically, this sinter has a structure in which coarsely-divided particles of varying shape 70 to 150 $\mu$ in particle diameter and finely-divided particles having a particle diameter of the order of 10 $\mu$ are intimately mixed.

The lanthanum chromite as the raw material is used in the form of $LaCrO_3$ or of $La_{1-n}M_nCrO_3$ (wherein, M stands for at least one member selected from the group consisting of calcium, magnesium and strontium and $n$ for 0.01 – 0.15). When the value of $n$ is smaller than the lower limit 0.01 of the range, no sufficient increase in the electroconductivity is obtained. When it is greater than the upper limit 0.15, then the sintering property is seriously degraded.

Two arc electrodes formed of the sinter produced as described above were used as a pair of opposed electrodes and caused to produce arc discharge, with the luminous intensity of the arc measured with a brightness meter. The spectral distribution was measured in the range of from 2300 to 7000 A by a spectrograph. In the spectrograph, numerous strong lines were observed to occur substantially continuously. The observation well agrees with the theory that La and Cr give rise to many spectral lines. Thus, the arc has been shown to have high luminous intensity and give spectral distribution approximating that of white light. In this test, the arc discharge was stable even when the temperature of the electrodes rose above 2500°C.

When the raw material has incorporated therein an oxidation accelerator, the sintering temperature can be lowered by about 300°C from the level of temperature at which the same raw material excluding the oxidation accelerator is normally sintered.

The sintering may be carried out under normal pressure. The sinter obtained in this case, however, has inferior compaction of particles compared with the sinter obtained under an increased pressure and permits occurrence of numerous voids. Nonetheless, this sinter is sufficiently practical. In terms of electrical properties, for example, it is not appreciably inferior to the sinter produced under an increased pressure.

The electric contact of the arc electrode with the electrode terminal can be improved by applying silver paste to one end of the side face of the sintered body and burning the deposited paste in accordance with a method commonly practiced. Possible fluctuation of the plane of arc discharge can be precluded and possible damage of electrodes due to thermal shock can be prevented by having the opposed ends of the arc electrodes ground in advance in the shape of cones.

The following examples are included merely to aid in the understanding of the invention, and variations may be made by one skilled in the art without departing from the spirit and scope of the invention.

EXAMPLE 1

Lanthanum-calcium chromite ($La_{0.95}Ca_{0.05}CrO_3$) particles having particle diameters not greater than 325 mesh and Lathanum-calcium chromite ($La_{0.90}Ca_{0.10}CrO_3$) particles obtained by electric fusion and having particle diameters in the range of 100 to 200 mesh were mixed at a ratio of 70 to 30 percent by weight, and 1 percent by weight, based on the resultant mixture of particles, of boron oxide prepared in the form of aqueous solution was admixed thereto. Four cylindrical holes 10mm in diameter and 80mm in depth formed in a graphite mold were filled each with 18g of the powder prepared as described above and the charged powder was sintered by means of a hot press. The sintering was carried out by allowing the charge to stand at 1360°C under 200 kg/cm² for 30 minutes. The sintered bodies thus obtained had a relative density (apparent density) of .88 percent. The resistance offered by the sintered bodies was 100 KΩ-cm. Then, the sintered bodies were held at 1500°C in the atmosphere to be oxidized. After this oxidation, the resistance offered was 1.7 Ω-cm, a value sufficient for the sintered bodies to serve as arc electrodes. The relative density was 83.5 percent. The dimensions were 10mm in diameter and 37mm in length.

Subsequently, silver paste was applied to a width of about 15mm on the side face at each end of the sintered bodies and heated in the atmosphere at 930°C for 10 minutes to produce a silver electrode thereon by burning.

The electrodes thus produced were tested for arc discharge performance under the following conditions:
Electric current used — DC 200 V, 5A, 10A
Duration of arc discharge — 7 to 16 minutes
Gap separating electrode tips — 3 to 6 mm
The results of the test were as follows:
  1. Surface temperature of the arc discharge zone of electrodes — 2000° to 2900°C
  2. Loss of electrode due to corrosion
     Anode — 1.5 mg/min
     Cathode — 6.9 mg/min
  3. Illumination — 131 luxes
  4. Color brightness — 23000 cd/m²
  5. In the spectrograph taken of the range of 2300 to 7000 A, numerous intensive lines are observed to occur substantially continuously, indicating that the light of this arc discharge closely resembles incandescent light.

For the purpose of comparison, the performance of the conventional countertype carbon electrodes under the aforementioned test conditions are given below.
  1. Loss of electrode due to corrosion
     Anode — 43 mg/min
     Cathode — 29 mg/min
  2. Illuminataion — 6 luxes
  3. Color brightness — 908 cd/m²

From these test results, it is seen that the arc electrodes according to this invention are superior to the conventional electrodes in terms of resistance to loss due to corrosion, illumination and color brightness.

EXAMPLE 2

Lanthanum-calcium chromite ($La_{0.95}Ca_{0.05}CrO_3$) particles having particle diameters not greater than 325 mesh was combined with 0.7 percent by weight of boron oxide prepared in the form of aqueous solution and mixed and dried. The resultant dry powder was placed in a graphite mold and sintered by being held at 1360° to 1380°C under 200 kg/cm² for 60 minutes. The sintered body had a relative density of 89.4 percent. This sintered body was oxidized by being held at 1500°C in the atmosphere for 1 hour. After this oxidation, the sintered body showed an electric resistance of 1.7 Ω-cm and a relative density of 86percent.

To give the shape of a truncated cone having a top 5mm in diameter to one end of the sintered body now measuring 10mm in diameter and 33cm in length, the edge portion of the body was ground off. To the other end of the sintered body, silver paste was applied and burnt to produce a test electrode. The arc electrode was tested for arc discharge performance under the following conditions:
Electric current used — AC 200 V, 5A
Duration of arc discharge — 30 seconds
Gap separating electrode tips — 3 mm
The results of the test were as shown below:
  1. Temperature at the tip of electrode — 2000° to 2900°C
  2. Loss of electrode due to corrosion — 4.9 mg/min as average per electrode
  3. Illumination — 12000 cd/m²
  4. Spectral distribution — Approximating incandescent light

What is claimed is:

1. An arc electrode for producing a spectral distribution, approximating that of white light formed of a sinter comprising essentially lanthanum chromite.

2. An arc electrode of claim 1, wherein a part of the lanthanum component of lanthanum chromite is replaced by at least one member selected from the group consisting of calcium, magnesium and strontium.

3. An arc electrode of claim 1, wherein the sinter is obtained by sintering lanthanum chromite particles of which between 20 and 50 percent by weight of said lanthanum chromite particles consists of particles produced by electric fusion.

4. An arc electrode of claim 2, wherein the sinter is obtained by sintering lanthanum chromite particles of which between 20 and 50 percent by weight of said lanthanum chromite particles consists of particles produced by electric fusion.

* * * * *